J. D. SMITH.
Corn-Planter
No. 21,375.
Patented Aug. 31, 1858.
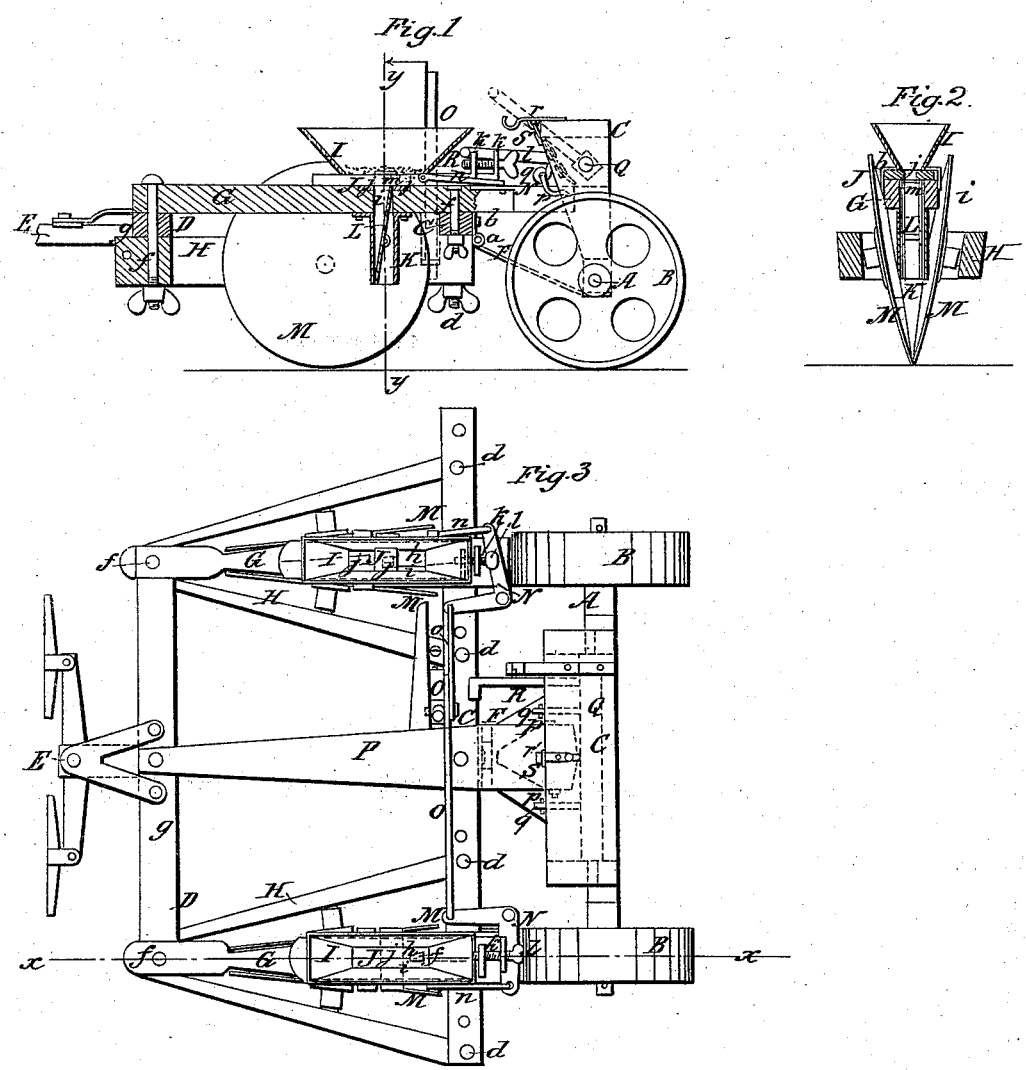

UNITED STATES PATENT OFFICE.

JOSEPH D. SMITH, OF LANCASTER, OHIO.

IMPROVEMENT IN SEEDING-MACHINES.

Specification forming part of Letters Patent No. 21,375, dated August 31, 1858.

*To all whom it may concern:*

Be it known that I, JOSEPH D. SMITH, of Lancaster, in the county of Fairfield and State of Ohio, have invented a new and Improved Seeding-Machine; and I do hereby declare that the following is a full, clear, and exact description of the same, reference being had to the annexed drawings, making a part of this specification, in which—

Figure 1 is a side sectional elevation of my invention, taken in the line $x x$, Fig. 3. Fig. 2 is a transverse section of the same, taken in the line $y y$, Fig. 1. Fig. 3 is a plan or top view of the same.

Similar letters of reference indicate corresponding parts in the several figures.

This invention relates to a new and improved machine for planting maize or corn and other seed in check-rows.

The invention consists in the combination of a peculiar seed-distributing device and a device for forming the necessary furrows to receive the seed, with a peculiar arrangement of the framing, whereby the device is allowed to conform to the inequalities of the ground, and the seed-distributing portion elevated free from the ground, when desired, as in moving from place to place or in turning at the ends of rows, &c.

To enable those skilled in the art to fully understand and construct my invention, I will proceed to describe it.

A represents an axle, having a wheel, B B, at each end, and C is a driver's seat, which is secured on the axle A at about its center.

D is a frame, to the front end of which the draft-pole E is attached. To the back end of the frame D the axle A is attached by a forked bar F. The front end of this bar is attached to a hinge, $a$, the upper or outer plate of which is attached, by a single bolt, $b$, to the center of the back cross-piece, $c$, of frame D, said bolt passing through the center of the outer plate of the hinge. This hinge $a$ forms, it will be seen, a universal-joint connection between the axle A and the frame D.

On the frame D longitudinal bars G are placed, one near each end, and secured by screw-bolts $f$, and to the under sides of the frame D V-shaped frames H are attached by screw-bolts $d$. The frames H are attached to the frame D at their back ends by separate screw-bolts, $d;$ but their front ends are secured by the same bolts, $f$, that pass through the front cross-piece, $g$, of the frame D.

On each bar G a hopper, I, is placed, and a slide, J, is placed on each bar G, said slides working underneath the hoppers I I. These slides are each formed of two parts, $h\ i$, and are notched, as shown at $j\ j$, a ledge or ear, $k$, being formed on the back end of each part $h\ i$, through which a screw, $l$, passes, and by which the size of the notches may be regulated as desired.

To the under side of each bar G a seed-tube, K, is attached, said tubes communicating each with an opening, $l'$, in the bars G, over which openings the slides J work. In each tube K a valve, L, is placed, said valves being pivoted at their centers and having their upper ends attached to their respective seed-slides, as shown at $m$. (See Figs. 1 and 2.)

The bars G and frames H may be attached to the frame D, nearer together or farther apart, by having a series of holes made through the back and front cross-bars, $c\ g$, so that the screw-bolts $d$ and $f$ may be passed through either of them, as may be desired.

In each V-shaped frame H two circular cutters or shares, M M, are placed. These cutters or shares are placed relatively in oblique positions with each other, so that their front edges a short distance below the axes will touch, the back edges of the cutters or shares being distended, as shown clearly in Fig. 3.

On the back part of each bar G a bent lever, N, is placed, said levers being connected at one end to the slides J by connecting-rods $n$, and the opposite ends being connected by rods $o$ to a lever, O, fitted in the frame D.

P is a bar, which is placed longitudinally and centrally on the frame D. The back end of this bar is connected by straps $p\ p$ to arms $q\ q$ on a shaft, Q, which is placed below the seat C, and has a lever or handle, R, attached.

To the back end of the bar P a chain, S, is attached, said chain being connected to a hook, $r$, on seat C.

The operation is as follows: As the machine is drawn along the rotating cutters or shares M form the necessary furrows to receive the seed, the cutters penetrating or cutting through weeds and insuring a perfect furrow, the furrow being produced by the obliquity of the cutters or shares, which also serve as a sort of chamber to insure the proper dropping of the seed. The operator grasps the lever O, and moves it at the proper time to actuate the slides J and valves L, the latter dividing the seed-tubes into two equal compartments, which alternately receive the seed from the holes $j$, and from the lower ends of which the seed is alternately discharged, said valves causing the seed to be discharged from points nearer the ground, and thereby insuring its proper distribution at desired spots. The wheels B cover the seed, and the frame D and the axle A being connected, as shown, they are allowed a movement independent of each other, and both the parts named are allowed to conform to the inequalities of the ground. In case the machine is to be removed from place to place, or, in other cases, when the seed is not to be distributed, the frame D is raised by turning the shaft Q, the lever or handle R being retained by a spring-catch, T.

I do not claim broadly the employment of two wheels for opening the furrow, the seed being dropped between the wheels; but,

Having thus described my invention, what I claim, and desire to secure by Letters Patent, is—

The arrangement and combination of the spout K, wheels M, frame H, and frame D, as and for the purposes herein shown and described.

JOSEPH D. SMITH.

Witnesses:
J. A. BOPE,
ALFRED McVEIGH.